United States Patent [19]
Mori

[11] Patent Number: 5,396,921
[45] Date of Patent: Mar. 14, 1995

[54] FLUID-FLOW CONTROLLING APPARATUS

[75] Inventor: Takaichi Mori, Tokyo, Japan

[73] Assignee: Arai Seisakusho Co., Ltd., Katsushika, Japan

[21] Appl. No.: 110,376

[22] Filed: Aug. 23, 1993

[51] Int. Cl.⁶ .................. F16K 31/26; F16K 33/00
[52] U.S. Cl. ..................... 137/426; 137/443; 137/445
[58] Field of Search ............... 137/434, 442, 443, 444, 137/445

[56] References Cited

U.S. PATENT DOCUMENTS

| | | | |
|---|---|---|---|
| 164,539 | 6/1875 | Fuller | 137/442 |
| 178,656 | 6/1876 | Meyer | 137/442 |
| 557,840 | 4/1896 | Lipp | 137/444 |
| 580,709 | 4/1897 | Paine | 137/426 |
| 686,335 | 11/1901 | Rowe | 137/426 |
| 707,337 | 8/1902 | Koch | 137/445 |
| 913,808 | 3/1909 | Caldwell | 137/445 |
| 1,821,699 | 9/1931 | Fleck | 137/443 |
| 1,859,580 | 5/1932 | Bush | 137/444 |
| 2,105,314 | 1/1938 | Duncan et al. | 137/444 |
| 2,649,772 | 8/1953 | Smith | 137/445 |
| 3,324,878 | 6/1967 | Dill | 137/445 |

FOREIGN PATENT DOCUMENTS 30237 5/1971 Japan.
142241 12/1973 Japan.

*Primary Examiner*—George L. Walton

[57] ABSTRACT

A fluid-flow controlling apparatus having a fluid-flow stopping state and a fluid-flowing state, wherein the valve body can be held positively at a determined position thereby to prevent any fluid leaks even when the pressure of supplied fluid is increased, said apparatus is characterized by: valve casing connected to the end of a fluid-supplying tube and comprising a valve seat and a slidable valve body; a reciprocating arm which is restricted by means of stoppers in its movement vertical to the flow direction in said valve casing; a connecting plate for connecting said valve body and said reciprocating arm together, said connecting plate being located in a direction parallel to said flow direction in said fluid-flow stopping state; a link mechanism for connecting a float to said reciprocating arm.

14 Claims, 2 Drawing Sheets

FLUID-FLOW CONTROLLING APPARATUS

TECHNICAL FIELD OF THE INVENTION

The present invention relates to a fluid-flow controlling apparatus, and more specifically to an apparatus of this type comprising valves for automatically controlling fluid-flowing state and fluid-stopping state by means of float.

BACKGROUND OF THE INVENTION

A fluid-flow controlling apparatus called "Pole-tap" for controlling fluid-flowing state and fluid-stopping state of fluid such as water by changing the lifting movement of float into the movement of a valve body on a valve seat through a link mechanism is known.

However, in the above described heretofore known fluid-flow controlling apparatus, the valve body is driven in response to the lifting power of said float, such that, when the pressure of supplied fluid is increased, a reaction is caused against the lifting power of float thereby tending to move the valve body in the direction departing from the valve seat, resulting in the undesirable water leaks, said valve body having been moved into the fluid-flow stopping state where the valve body is in contact with the valve seat, starting from the fluid-flowing state where the valve body is departed from the valve seat.

SUMMARY OF THE INVENTION

Accordingly, it is among the objects of the present invention to provide fluid-flow controlling apparatus which eliminates the above described disadvantages and can hold the valve body at the predetermined position even when the pressure of fluid is increased, thereby to positively prevent water leaks.

For the purpose of obtaining the above object, a fluid-flow controlling apparatus according to the invention has a fluid-flow stopping state and a fluid-flowing state, and said apparatus is characterized by: valve casing connected to the end of a fluid-supplying tube and comprising a valve seat and a slidable valve body; a reciprocating arm which is restricted by means of stoppers in its movement vertical to the flow direction in said valve casing; a connecting plate for connecting said valve body and said reciprocating arm together, said connecting plate being located in a direction parallel to said flow direction in said fluid-flow stopping state; a link mechanism for connecting a float to said reciprocating arm.

In the fluid-flow controlling apparatus having the construction as described above, the valve body can be held or seated on the valve seat by means of the connecting plate located in the direction parallel to the flow direction in said fluid-flow stopping state, so as to hold positively the seating position of valve body.

As described above, the fluid-flow controlling apparatus according to the invention has an advantage that the valve body can be held positively at a determined position thereby to prevent any fluid leaks even when the pressure of supplied fluid is increased.

BRIEF DESCRIPTION OF THE DRAWINGS

For a better understanding of the present invention, the scope of which will be pointed out in the appended claims, reference is made to the following detailed descriptions of exemplary embodiments thereof, taken in conjunction with the accompanying drawings, in which:

DETAILED DESCRIPTION OF THE PREFERRED EMBODIMENT

Figure 1:
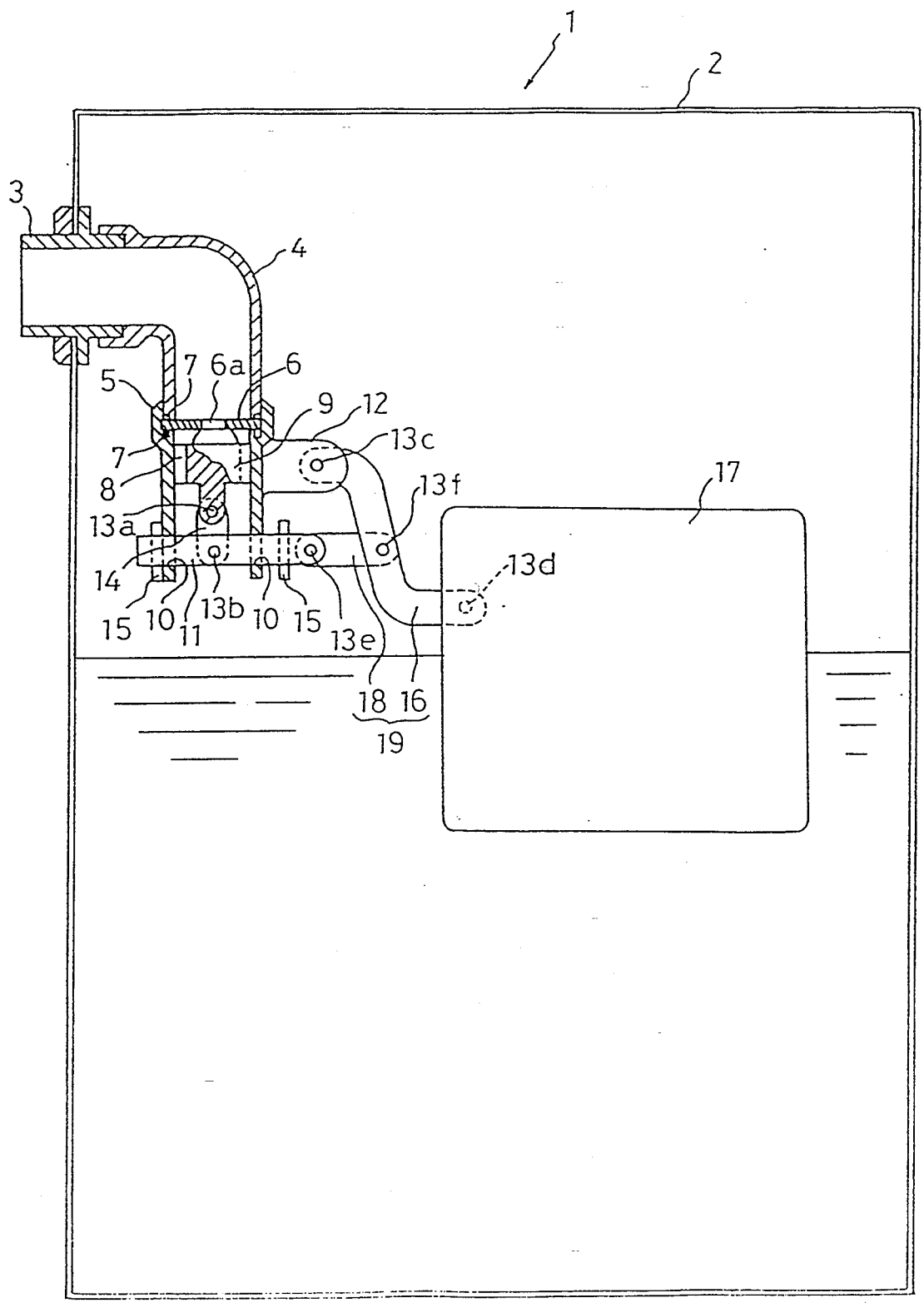
FIG. 1 is a partly broken-out side view showing the fluid-flow stopping state of an embodiment of the fluid-flow controlling apparatus according to the invention.
Figure 2:
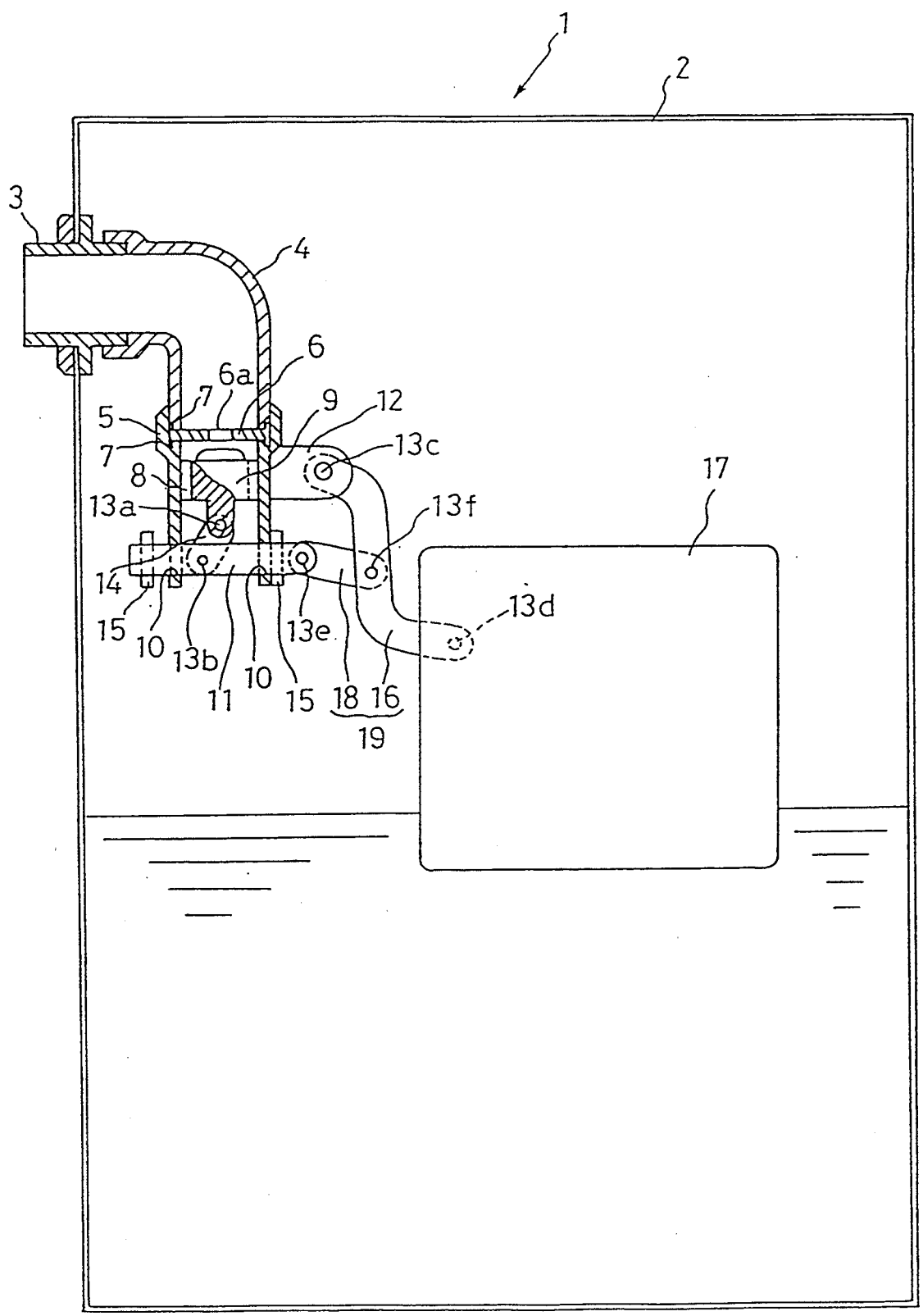
FIG. 2 is a view similar to FIG. 1 showing the fluid-flowing state of an embodiment of the fluid-flow controlling apparatus according to the invention.

With reference to FIGS. 1 and 2, particularly to FIG. 1 showing the fluid-flow stopping state of an embodiment of the fluid-flow controlling apparatus according to the invention, the apparatus 1 comprises a fluid-fed body or tank 2 and a fluid-supplying tube 3, one end of which is provided on a suitable side wall of said tank 2 so as to protrude into the interior of said tank 2. Said end of tube 3 is provided with an elbow 4 suitable for changing the direction of supplied fluid (such as water) from the horizontal direction to the vertical direction in FIG. 1. On the front end of said elbow 4, a valve casing 5 having substantially cylindrical form is attached detachably by means of suitable connecting means such as screws.

In the connection between said elbow 4 and said valve casing 5, a valve seat 6 of suitable materials having a central communicating hole 6a is provided by means of suitable sealing means such as O-ring 7. A valve body 9 is located in said valve casing 5, said valve body 9 being slidable along the inner surface of said valve casing 5 so as to come into contact with said valve seat 6 and depart therefrom, and said valve body 9 having therein a suitable duct 8 for discharging supplied fluid into said tank 2 in the fluid-flowing state. Further, flow-through openings 10 are provided in the lower portions of said valve casing 5 in a direction vertical to the flowing direction of supplied fluid. A reciprocating arm 10 is provided in said openings 10 so as to protrude its both ends outside of said valve casing 5. A fixed arm 12 is also provided in a desired position on the outer surface of said valve casing 5 so as to extend substantially in parallel with said reciprocating arm 11. A connecting plate 14 having suitable form is rotatably attached at its both ends to the lower end of said valve body 9 and to a desired position on said reciprocating arm 11 in said valve casing 5 by means of suitable connecting means such as pins 13a, 13b. Further, said connecting plate 14 is constructed so as to be located in the direction parallel to said flowing direction wherein said valve body 9 is applied to said valve seat 6 thereby to bring about the fluid-flow stopping state. For this purpose, stoppers such as taper pins 15 for restricting the movement of said reciprocating arm 11 to said fluid-flow stopping state and said fluid-flowing state as desired are provided in the desired positions on the outer protruding portions of said reciprocating arm 11.

A supporting arm 16 having a suitable form is rotatably connected at its end to one end of said fixed arm 12 by means of suitable connecting member 13c such as pin. A float 17 having a desirable form is connected to another end of said supporting arm 16 by means of suitable connecting member 13d such as pin. But the float 17 is able to rotate only small degrees on the connecting member 13d. An intermediate plate 18 having a suitable form is connected at its both ends to the substantially central portion of said supporting arm 16 and to one end of said reciprocating arm 11 by means of suitable connecting means 13e, 13f, said supporting arm 16 and said intermediate plate 18 constituting thus a link mechanism 19. In other words, the reciprocating arm 11 and the float 17 are connected to each other through said link mechanism 19.

Further, the stoppers 15 may be located at any suitable positions for restricting the bilateral movements of the reciprocating arm 11 between the fluid-flowing state and the fluid-flow stopping state, for example at suitable positions within the valve casing 5. Said positions of stoppers 15 do not constitute the scope of the present invention.

FIG. 1 shows the fluid-flow stopping state wherein fluid supplied into the inlet tube is interrupted by the valve mechanism, and FIG. 2 is a similar view as FIG. 1 showing the fluid-flowing state of the fluid-flow controlling apparatus.

In the fluid-flow controlling apparatus 1 in the fluid-flow stopping state wherein the valve body 9 is applied on the valve seat 6 thereby to interrupt supplied fluid, when the fluid level in said tank 2 is lowered, the float 7 begins to rotate clockwise about the connecting member 13c between fixed arm 12 and supporting arm 16. Along with the clockwise rotation of supporting arm 16, said intermediate supporting plate 18 connected to the central portion of supporting arm 16 begins to rotate clockwise about the connecting member 13e thereby to move said intermediate supporting plate 18 and said reciprocating arm 11 connected thereto on the left side. In other words, the lowering movement of float 17 can be converted into the shifting movement of reciprocating arm 11 through said link mechanism 19. Along with the left side shift of reciprocating arm 11, the lower end of said connecting plate 14 connected to reciprocating arm 11 is shifted on the left side. This causes said connecting plate 14 to rotate clockwise about the connecting member 13a while shifting downwards. Thus, valve body 9 connected to the connecting plate 14 is caused to shift downwards while sliding on the inner surface of the valve casing 5 thereby to separate valve body 9 from the valve seat 6. At this moment, fluid under pressure supplied into the inlet tube 3 flows down from the valve seat 6 and the valve body 9 through said communicating hole 6a and said duct 8 thereby to bring about the fluid-flowing state. The left-side shift of said reciprocating arm 11 is stopped at a determined position by means of stopper 15 located on the right-side portion of the reciprocating arm 11 as shown in the fluid-flowing state of FIG. 2.

When the fluid is then accumulated in the tank 2 in the fluid-flowing state as shown in FIG. 2 and the fluid level is raised, the float 17 begins to rotate counter-clockwise about said connecting member 13c between the fixed arm 12 and the supporting arm 16 along with the rising of fluid level. Along with the counter-clockwise rotation of supporting arm 16, said intermediate supporting plate 18 connected to the central portion of supporting arm 16 begins to rotate counter-clockwise about the connecting member 13e thereby to move said intermediate supporting plate 18 and said reciprocating arm 11 connected thereto on the right side. In other-words, the rising movement of float 17 can be converted into the shifting movement of reciprocating arm 11 through said link mechanism 19. Along with the right side shift of reciprocating arm 11, the lower end of said connecting plate 14 connected to reciprocating arm 11 is shifted on the right side. This causes said connecting plate 14 to rotate counter-clockwise about the connecting member 13a while shifting upwards. Thus valve body 9 connected to the connecting plate 14 is caused to shift upwards while sliding on the inner surface of the valve casing 5 thereby to apply the valve body 9 on the valve seat 6 with said connecting plate 14 being held in a direction parallel to the vertical flow direction in FIGS. 1 and 2, stopping thereby the fluid-flow into the tank 2. At the same time, the lefthand shift of the reciprocating arm 11 is stopped by the stopper 15 provided in the right portion of said arm 11 thereby to return to the fluid-flow stopping state as shown in FIG. 1. In other words, the valve body 9 is supported by the connecting plate 14 located in said direction parallel to the flow direction, and said connecting plate 14 is supported by said reciprocating arm 11 positioned in a direction vertical to the flow direction and by said openings 10 in valve casing 5. Under these conditions, position and sitting attitude of said valve body 9 can be held positively even when pressure of supplied fluid(water) is raised to higher values such as for example 3 MPa or more, thereby to obtain an increased pressure resistance against supplied fluid.

In the fluid-flow controlling apparatus 1 according to the invention, vertical movement of float 17 along with variation of fluid level in the tank 2 can be readily converted into the shifting movement of said link mechanism 19, and said shifting movement of said reciprocating arm 11 can be restricted within a determined scope by means of the stoppers 15. Accordingly, even when the tank 2 has a large capacity and depth of fluid, the supporting arm 16 forming the link mechanism 19 need not have a large length, so that the float 17 can be located at a nearer position, thereby to decrease the necessary space and to minimize the entire apparatus.

Further, the fluid-flow controlling apparatus according to the invention has the advantage that the constituents thereof can be readily decomposed, showing a higher maintenance adaptability.

While the present invention has been described with reference to exemplary embodiments thereof, it will be appreciated by those skilled in the art that variations and modifications may be made thereto without departing from the spirit of the inventive concepts disclosed herein. All such variations and modifications are intended to fall within the scope of the claims appended hereto.

What we claim:

1. A fluid-flow controlling apparatus having a fluid-flow stopping state and a fluid-flowing state, said apparatus is characterized by:
   a. valve casing connected to the downwardly opening end of a vertically oriented fluid-supplying tube and comprising a valve seat and a slidable valve body;
   b. a reciprocating arm movable through an opening at one end of said valve casing, which is restricted by means of variably positionable stoppers at each end thereof in its movement transverse to the flow direction in said valve casing;
   c. a connecting plate for movably connecting one end of said valve body and an intermediate portion of said reciprocating arm together, said connecting plate being located in direction parallel to said flow direction in said fluid-flow stopping state;
   d. a movable link mechanism for connecting a float to one end of said reciprocating arm adjacent one of said variable stoppers for variably reciprocating said arm through said opening as said variable stoppers selectably engage opposite sides of said valve casing at said opening, to variably control the movement of said valve body as said float moves in response to differing levels of fluid in a reservoir.

2. Fluid-flow control apparatus having closed and open states, comprising:
   a. a valve connected to the downwardly opening end of a vertically oriented fluid supply tube emptying into a reservoir, comprising:
      i. a horizontal valve seat; and
      ii. a valve body vertically slidable against and away from said seat to define said closed and open states respectively;
   b. a horizontally reciprocable arm downstream of said valve body;
   c. variable positionable means on said arm for restricting horizontal reciprocating movement of said arm transversely to fluid flow direction through said valve between an arm position at which said valve is open and an arm position at which said valve is closed;
   d. a link, pivotally connecting said valve body and said reciprocable arm, said link being parallel to direction of fluid flow through said valve, for translating horizontal movement of said arm into vertical movement of said valve body; and
   e. a two-bar linkage connecting a float in said reservoir to said arm, for reciprocating said arm, thereby moving said link and translating horizontal movement of said arm into vertical movement of said valve body thereby controlling movement of said valve body against and away from said seat to open and close said valve responsively to float movement as fluid level in said reservoir changes.

3. Apparatus of claim 2 wherein said link is connected to an intermediate portion of said valve body.

4. Apparatus of claim 3 wherein said link is connected to one end of said valve body.

5. Apparatus of claim 4 wherein said two bar linkage connects to said arm adjacent one of said stopper means.

6. Apparatus of claim 5 wherein said two bar linkage and said link are co-planar.

7. Apparatus of claim 6 wherein said valve includes a cylindrical casing portion extending vertically downwardly with said body and said link being movable vertically therewithin, wherein said arm is mounted within said casing for horizontal movement with respect thereto as said fluid passes downwardly through said casing and around said arm.

8. Apparatus of claim 7 wherein said means for restricting movement of said arm are mounted on said arm outside of said casing on respective sides thereof and restrict arm movement by interfering with said casing.

9. Apparatus of claim 2 wherein said link is connected to one end of said valve body.

10. Apparatus of claim 2 wherein said two bar linkage connects to said arm adjacent one of said stopper means.

11. Apparatus of claim 2 wherein said two bar linkage and said link are co-planar.

12. Apparatus of claim 2 wherein said valve includes a cylindrical casing portion extending vertically downwardly with said body and said link being movable vertically therewithin, wherein said arm is mounted within said casing for horizontal movement with respect thereto as said fluid passes downwardly through said casing and around said arm.

13. Apparatus of claim 12 wherein said means for restricting movement of said arm are mounted on said arm outside of said casing on respective sides thereof and restrict arm movement by interfering with said casing.

14. Apparatus for controlling fluid supplied through a supply line to a reservoir in response to fluid level in said reservoir, comprising:
   a. a valve connected to a vertically downwardly opening end of said fluid supply line emptying into said reservoir, comprising:
      i. a horizontal valve seat having an aperture at the center thereof; and
      ii. a valve body below said seat, having a curved annular portion for contacting said seat about the periphery of said aperture, said body being vertically slidable against and away from said seat to respectively define said closed and open states of said valve;
      iii. a cylindrical casing portion of said valve extending downwardly from said fluid supply line, said seat and body residing within said body;
   b. a horizontally reciprocable arm downstream of said valve body, slidably resident within said casing such that fluid flowing through said valve when open passes around a central portion of said arm within said casing, said arm extending laterally from either side of said casing;
   c. variable positionable stopper means on extension portions of said arm outside of said casing, on either side thereof, for restricting horizontal reciprocating movement of said arm transversely to fluid flow direction through said valve between an arm position at which said valve is open and an arm position at which said valve is closed by respectively interfering with the exterior of said casing at said respective arm positions;
   d. a link pivotally connecting said valve body and said central portion of said reciprocable arm within said casing, said link being generally parallel to direction of fluid flow through said valve, said link in a vertical position, corresponding to said arm being at a first preselected position, urging said valve body against said seat to thereby close said valve, said link when displaced from vertical with an end of said link connected to said arm being laterally displaced due to horizontal displacement of said arm from a position of valve closure, retaining said valve body at a position removed from said seat thereby opening said valve for translating horizontal movement of said arm into vertical movement of said valve body; and
   e. a two-bar linkage pivotally connected to said casing, coplanar with said arm and pivotally connecting a float in said reservoir to an end of said arm for horizontally reciprocating said arm thereby moving said link and translating horizontal movement of said arm into vertical movement of said valve body and thereby controlling movement of said valve body against and away from said seat to open and close said valve responsively to float movement as fluid level in said reservoir changes; comprising:
      i. a curved bar pivotally connected at one end thereof to said casing and at a remaining end thereof to said float; and
      ii. a straight bar pivotally connecting a central portion of said curved bar to an extremity of said reciprocable arm outside of said casing for reciprocating said arm responsively to arcuate movement of said curved bar about a point of pivotal connection of said curved bar and said casing.

* * * * *